United States Patent [19]

Theodore et al.

[11] Patent Number: 4,615,851
[45] Date of Patent: Oct. 7, 1986

[54] PREPARATION OF BETA"-ALUMINA TUBES BY THE EXTRUSION PROCESS

[75] Inventors: Ares N. Theodore, Farmington Hills; Robert A. Pett, Franklin, both of Mich.

[73] Assignee: Ford Motor Company, Dearborn, Mich.

[21] Appl. No.: 704,882

[22] Filed: Feb. 21, 1985

Related U.S. Application Data

[63] Continuation of Ser. No. 479,105, Mar. 28, 1983, abandoned, which is a continuation of Ser. No. 300,369, Sep. 8, 1981, abandoned.

[51] Int. Cl.⁴ ............................................ C04B 35/64
[52] U.S. Cl. ..................................... 264/63; 264/150; 264/209.1; 264/176.1
[58] Field of Search .................. 264/63, 176 R, 209.1, 264/150

[56] References Cited

U.S. PATENT DOCUMENTS

| | | | |
|---|---|---|---|
| 3,687,735 | 8/1972 | Inoue .................................... | 264/61 |
| 4,158,688 | 6/1979 | Pett et al. ............................. | 264/63 |
| 4,158,689 | 6/1979 | Pett et al. ............................. | 264/63 |
| 4,265,794 | 5/1981 | Pett et al. ............................. | 264/63 |
| 4,267,086 | 5/1981 | Pett et al. ........................... | 260/28.5 |

OTHER PUBLICATIONS

Report entitled "Fabrication of Thin Layer Beta'-'-Alumina" by Gerald J. Tennenhouse and Robert A Pett, prepared for the National Aeronautics and Space Administration and submitted pursuant to Contract NASA-19782.

*Primary Examiner*—James Derrington
*Attorney, Agent, or Firm*—Lorraine S. Melotik; Roger L. May

[57] ABSTRACT

This invention relates to an extrusion method of preparing tubular green bodies, in particular those having thin walled thickness, which after burnout and sintering have properties similar or better than those of tubular bodies produced by isostatic pressing and are suitable for use in the sodium/sulfur battery. The method comprises extruding a mixture of 40–60 volume percent of sinterable particulate solids consisting essentially of a particle size distribution of beta"-alumina precursor particulate comprising alpha-alumina and 60–40 volume percent organic sacrificial binder consisting essentially of a thermoplastic block copolymer, plasticizers comprising two oils and two waxes, stiffening thermoplastic polymers and processing aids. In the preferred embodiment, the composition of the particulate comprises 8.85 weight percent $Na_2O$, 0.75 weight percent $Li_2O$ and 90.4 weight percent $Al_2O_3$ and the temperature of the material is maintained between about 135°–150° C. during extrusion.

The die used to extrude the mixture has a ratio of the length of the die to the wall thickness of the tubular green body extruded of greater than about 5:1. The tubular green body is extruded over a mandrel.

21 Claims, 2 Drawing Figures

PREPARATION OF BETA″-ALUMINA TUBES BY THE EXTRUSION PROCESS

This application is a continuation of application Ser. No. 479,105, filed Mar. 28, 1983, now abandoned, which is a continuation of application U.S. Ser. No. 300,369, filed Sept. 8, 1981 now abandoned.

Reference is made to commonly assigned and concurrently filed related U.S. applications Ser. Nos. 300,368, now abandoned, entitled "Process for Molding Complex Beta″-Alumina Shapes for Sodium/Sulfur Batteries" to Theodore et al and 300,404, now U.S. Pat. No. 4,364,783, entitled "Ultrasonic End-Capping of Beta″-Alumina Tubes" to Theodore et al.

BACKGROUND OF THE INVENTION

This invention relates to preparation of tubular beta″-alumina ceramic bodies by the extrusion process. More particularly, this invention relates to preparation of tubular beta″-alumina ceramic precursors, also known as green bodies, which after sintering, have properties which are similar or better than those of tubular bodies produced by isostatic pressing, i.e., density greater than 98% of theoretical, resistivity approximately 5 ohm centimeters at 300° C. and a helium leak rate less than $3 \times 10^{-9}$ cc/cm$^2$/sec. Still more particularly, the invention relates to an extrusion process by which tubing which is straight and smooth (inside and out) and free from impurities and imperfection is produced in a continuous manner.

Techniques have been developed for the preparation of beta″-alumina tubular ceramic bodies in which a ceramic-binder composition is isostatically pressed in a tubular mold, after which binder is burned off, and then the tubes are sintered. However, that isostatic method is not well suited to the preparation of tubes, particularly those having thin wall thicknesses, because of the formidable problems associated with mold filling prior to isostatic pressing and sample removal after pressing.

U.S. Pat. Nos. 4,158,688 and 4,158,689 to Pett et al, which are commonly assigned with this application, disclose preparation of green bodies of unusual dimensional precision using sacrificial binder similar to that of this invention. In those patents, the green bodies formed include compression molded cordierite ribbed sheets and extrusion molded beta″-alumina precursor particulate tubes. Particulate solids such as beta″-alumina ceramic precursor particulate have special properties inhibiting their facile shaping into dense sintered articles. As opposed to cordierite particulates, they are not as readily wetted by the binder ingredients. Furthermore, certain forms of such beta″-alumina precursor particulates inhibit the flow of sacrificial binder composition containing them. However, neither the binder compositions used with the cordierite nor the extrusion compositions used to make the tubes is optimal for use in extrusion molding of the beta″-alumina precursor particulate tubular green bodies of the subject invention. This invention permits improvements in the extrusion molding of sacrificial binder composition densly packed with powdered beta″-alumina precursor particulate into tubular green bodies, particularly those having thin wall thickness suitable for use in a sodium sulfur battery.

BRIEF DESCRIPTION OF THE INVENTION

This invention relates to an extrusion process by which tubing, straight, smooth and free from imperfections is produced in a continuous manner. The process comprises providing a mixture of about 40–60 volume percent of sinterable particulate solids consisting essentially of a particle size distribution of beta″-alumina precursor particulate comprising alpha-alumina and about 60–40 volume percent organic sacrifical binder into a means for extruding the mixture, applying heat and pressure to the mixture in the extruder means, and maintaining the heat and pressure on the mixture to extrude tubing over a mandrel at a rate which allows extrusion of a length of smooth tube.

The binder employed in the process of this invention consists essentially of (a) a thermoplastic block copolymer component selected from the group consisting of linear, radial, and linear and radial block copolymers having a first aromatic block which is glassy or crystalline at 20°–25° C., and which has a softening point between about 80°–250° C. and a second aliphatic block which is different from the first block and behaves as an elastomer at temperatures between about 15° C. below and about 100° C. above the softening point of the first block; (b) selected from the group consisting of oil at least about 75 percent by weight of which boils in a range between about 285° C.–560° C., and which has a viscosity of between about 30–220 Saybolt Universal Seconds (SUS) at 100° C., and an Aniline Point in a range between about 75°–125° C.; (c) two waxes selected from the group consisting of wax which melts at a temperature in the range between about 55°–80° C., and at least 75 percent by weight of which boils at temperatures in a range between about 315°–490° C.; (d) a stiffening thermoplastic polymer which is glassy or crystalline at 20°–25° C., and which has a softening point between about 80°–250° C. and comprises aromatic monomeric units associable with block copolymer (a); (e) a second stiffening thermoplastic polymer different from said first polymer, and which is glassy or crystalline at 20°–25° C., and which has a softening point between 80°–250° C. and comprises aromatic monomeric units associable with block copolymer (a); and (f) processing aid comprising esters of fatty acids. In the binder composition, the weight of (a) is greater than (b) and (c) combined, greater than (d) and (e) combined and greater than about two times (b), (c), (d), (e) or (f) alone. The order of mixing is as follows: the thermoplastic block copolymer (a), the sinterable particulate, the wax (c), the stiffening agent (d and e), the oil (b), and the processing aids (f). The extruding means contains an extrusion die wherein the ratio of the length of the die to the wall thickness of the tube being extruded is greater than about 5:1.

In the preferred embodiment, wherein the beta″-alumina precursor particulate consists essentially of 8.85 weight percent Na$_2$O, 0.75 weight percent Li$_2$O and 90.4 weight percent Al$_2$O$_3$, the temperature of the extrudate is preferrably maintained between about 135°–150° C. during extrusion.

DETAILED DESCRIPTION OF THE INVENTION

As discussed above, the improved method of this invention relates to the extrusion molding of a mixture of sinterable particulate and sacrificial binder into tubular green bodies, which after sintering are similar or better than those produced by isostatic pressing. Each of the components of the mixture and processing steps are hereinafter described in greater detail.

Figure 1:
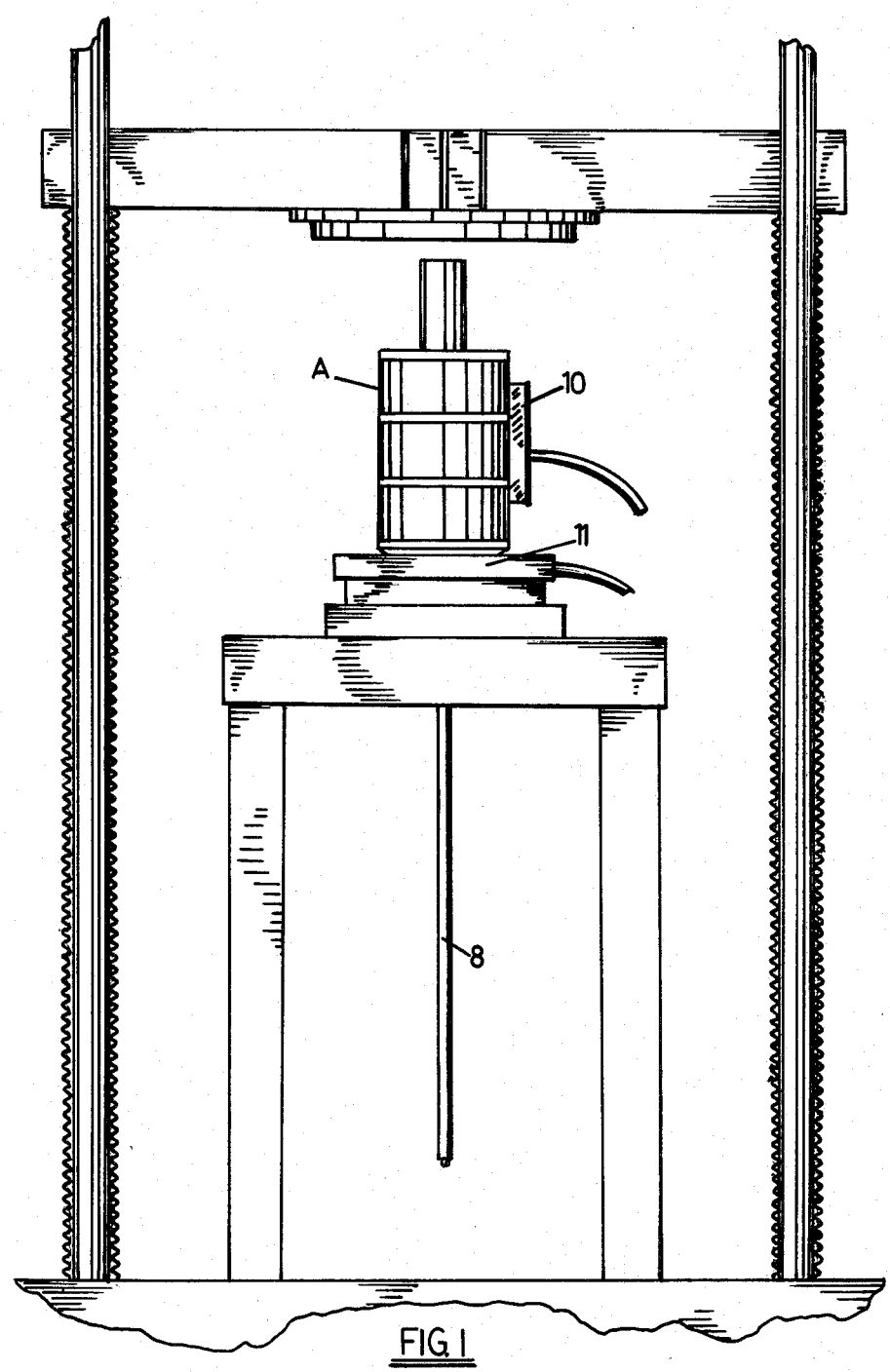
FIG. 1 illustrates laboratory equipment suitable for extruding the tubes of the subject invention.
Figure 2:
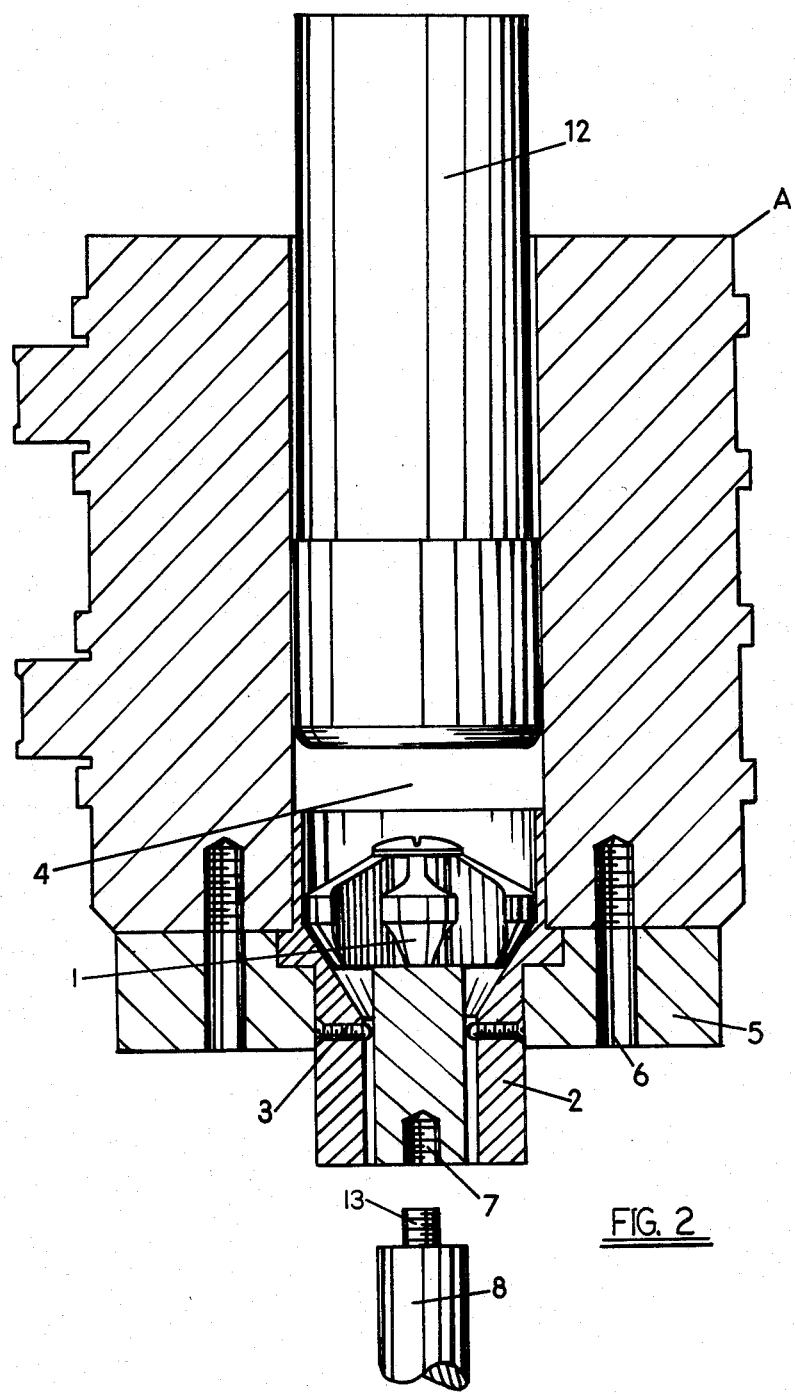
FIG. 2 is a fragmentary sectional view taken from FIG. 1 and illustrates in particular the placement and design of the extrusion die.

The tubes were extruded using a ram type extrusion apparatus as shown in FIG. 1. The die is assembled in the extruder A as indicated in detail in FIG. 2. The die consists of two parts, the inner die part 1 which fits into the outer die part 2. The inner die part is securely centrally positioned within the outer die part by means of the three positioning screws 3. As the mixture passes the positioning screws, it will separate into strips. Therefore, the die must have sufficient length after these screws, in order that the strips of material "knit" into a smooth, sound tube. Too short a die, after the screws, will result in extrusion of strips of material, while too long a die will require excessive pressure to perform the extrusion. It has been found that a ratio of this die length, after the screws, to the wall thickness of the tubes extruded must be greater than 5. A ratio of 61 is suitable for the 7 mm OD, 400 micrometer wall thickness, and a ratio of 12 is suitable for use with tubes whose diameter is 12 millimeters O.D. 1000 micrometers wall thickness, or larger.

The die is mounted a short distance up into the barrel 4 of the extruder by means of ring 5, which is affixed to the extruder with four screws 6. The bottom of the inner die part has a threaded opening 7 used to affix the mandrel 8, which has a set screw affixed at each end. The extruder and die are heated by means of the extruder heater 10 and the block heater 11 (FIG. 1) surrounding the lower portion of the die.

The beta"-alumina precursor particulate is mixed with the binder ingredients on a roll mill, after which the milled sheet is cut or broken into pieces whose size allow convenient insertion into the extruder barrel. This material is then pressed into the extruder barrel, which has generally been preheated. The material is then heated to the desired temperature, that which is found most suitable for producing tubing of good quality from the particular composition and material being extruded. In one preferred embodiment of this invention, wherein the beta"-alumina precursor particulate consists essentially of 8.85 weight percent of $Na_2O$, 0.75 weight percent $Li_2O$ and 90.4 weight percent $Al_2O_3$, the preferred temperature of the mixture during extrusion is between about 135°–150° C., and most preferably between about 137°–145° C. The temperature at various places on the surface of the extruder housing and block heater as well as the low portion of the die set is monitored by means of a digital thermometer.

Ram 12 is then forced against the composition in the barrel to extrude tubing from the die orifice. The rate at which the tube is extruded and the temperature of the barrel and die are adjusted until a smooth tube is obtained. The tube is extruded over a mandrel 8 which has been affixed to the bottom of the inner die part by means of a screw 13, generally after the material has come to processing temperature. The mandrel is used to maintain straight tubing while the green body is still hot enough to deform easily. The diameter of the mandrel is slightly smaller than the diameter of the bottom portion of the inner die part. After a sufficient length of tubing has been extruded, it is cut from the die and placed upon another mandrel for cooling to room temperature. After reaching ambient temperature, the tubing can be easily handled and stored without the use of a mandrel. If the top end of the mandrel has become hot during processing, prior to another extrusion, it can be unscrewed and then the cooler opposite end attached to the die end. Similarly, during binder burnout, it has been found advantageous to support the tubes in a vertical position by slipping them over a mandrel whose diameter is small enough to allow shrinkage of the tube during binder removal. These tubes may be held in a desiccator until ready for sintering.

SACRIFICIAL BINDER

The sacrificial binders of this invention comprise a major amount by weight of a block copolymer thermoplastic elastomer, plasticizer therefor stiffening thermoplastic polymer, and processing aids.

The block copolymer may be a linear block copolymer such as is disclosed in U.S. Pat. No. 4,158,689, a radial block copolymer such as is disclosed in U.S. Pat. No. 4,148,688, or a combination of these block copolymers. The disclosures of U.S. Pat. Nos. 4,158,688 and 4,158,689 are hereby incorporated by reference.

Suitable radial block polymers for use in this invention are those having the structural formula

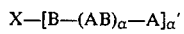

$$X\text{—}[B\text{—}(AB)_\alpha\text{—}A]_{\alpha'}$$

wherein "X" is a linking group, A or B, "α" is 0 or a positive integer, "α'" is a positive integer greater than 2, "A" is a linear or branched polymer that is glassy or crystalline at room temperature 20°–25° C. and has its softening point in the range of about 80° C. to about 250° C. and "B" is a polymer different from "A" that behaves as an elastomer at processing temperatures, i.e., between about 15° C. below and about 100° C. above the softening point of "A".

Suitable linear block polymers for use in this invention are those having the structural formula

$$AB\text{—}(AB)_\alpha\text{—}A$$

wherein "α" is 0 or a positive integer, "A" is a linear or branched polymer that is glassy or crystalline at room temperature and has a softening point in the range of about 80° C. to about 250° C. and "B" is a polymer different from "A" that behaves as an elastomer at processing temperatures.

Linear and radial block copolymers are widely known. Commercially available linear and radial block copolymers are Kratons and Solprenes, respectively. Kraton is a tradename of Shell Oil Company and Solprene is a tradename of Phillips Petroleum Company. Other examples of these polymers appear in *Rubber Technology*, "Thermoplastic Elastomers," Hendricks et al, 2nd Edition, pp. 515–533, VAN NOSTRAND, N.Y. (1973) and *Rubber World*, "Compounding Radial Block Copolymers."

The binders of this invention preferably comprise a block copolymer consisting essentially of thermoplastic radial block copolymer. Of the radial block copolymers, those with aforedescribed "A" and "B" blocks are preferred, with aromatic "A" block and aliphatic "B" block being preferred. Other "A" and "B" blocks appear in Col. 2, line 56 through Col. 3, line 3 of U.S. Pat.

No. 4,158,688. The preferred radial block copolymers, suitable for use in this invention have molecular weights ($M_w$) of about 100,000–200,000, a specific gravity between 0.9–1., and an apparent viscosity of between about 40–50 thousand poise at 10 seconds$^{-1}$ at about 20°–25° C.

The molecular weights of the "A" segments and the "B" segments of the block copolymers suitable for use in the method of this invention will vary with the polymer segment involved as will be obvious to one skilled in the art in that physical characteristics must be met as hereinbefore recited. For instance, where the block copolymer has polystyrene "A" blocks and polybutadiene "B" blocks, preferably unsaturated polybutylbutadiene, the polystyrene segments advantageously have number average molecular weights ($\overline{M}_n$) below about 20,000 and at least two of such segments have molecular weights ($\overline{M}_n$) above about 10,000. While the polybutadiene segments advantageously have molecular weights ($\overline{M}_n$) below about 80,000 and at least one such segment has a molecular weight $\overline{M}_n$) above about 15,000. The lower limit of molecular weight ($\overline{M}_n$) for the two "A" blocks is governed by the minimum "A" block chain length required to insure the formation of a heterogeneous phase while the upper limit of "A" blocks is set by the viscosity of both "A" and "B" blocks when such viscosity begins to hamper domain formation or processing.

The sacrifical binder employed in the method of this invention includes a plasticizer comprising oil and a wax in combination. The oils and waxes used for this purpose are naphthenic, paraffinic or a mixture of paraffinic and naphthenic constituents. They are sufficiently volatile to be removed easily and rapidly in the burn-out process but insufficiently volatile to be substantially removed during mixing and/or molding. The loss due to volatilization during mixing and/or molding is advantageously below 20 and preferably below 10 weight percent. The selection is such that their evolution during burn out takes place over a broad temperature range, thus avoiding stress points and defects in parts.

Functionally, the oils and waxes must be compatible with the rubbery phase of the principal binder resin when it becomes rubbery on plasticization at a temperature somewhat below the softening point of the "A" segments of the principal resin. This gives the binder a capability of accepting higher filler loadings while remaining strong and flexible.

At least 75% by weight of the oils used as plasticizers boil in the range of about 285° C. to about 560° C., preferably in the range of about 285° C. to about 465° C. They have viscosities at 100° C. in the range of about 30 to about 220 Saybolt Universal Seconds, hereinafter referred to as S.U.S., advantageously in the range of about 35 to about 155 S.U.S., and preferably in the range of about 35 to about 80 S.U.S. These oils have an Aniline Point in the range of about 75° C. to about 125° C. The oils may be a product of petroleum refining operations or vegetable or animal oils and they may include or be low molecular weight synthetic polymers such as polystyrene, poly(alpha-methyl styrene), or a polyolefin. Examples of suitable commercially available oils include Flexon 580, 680, 765 and 845 marketed by Exxon and Shellflex 131, 371 and 790 marketed by Shell Chemical Co.

The waxes used have melting points in the range of about 55° C. to about 80° C. At least about 75% by weight of such wax boils at temperatures in the range of about 315° C. to about 490° C. These may be a product of petroleum refining operations, vegetable or animal oils or synthetic polymers such as low molecular weight polyolefins. Examples of suitable commercially available waxes are Sunoco Wax 3420, 4412 and 4418 marketed by Sun Chemical as well as paraffin wax (M.P. 54° C.) marketed by International Wax Refining.

The binder of this invention further includes a first and a second stiffening thermoplastic polymer which are glassy or crystalline at 20°–25° C., have a softening point between about 80°–250° C. and comprise aromatic monomeric units associable with the block copolymer. The stiffening polymer preferably has a molecular weight in the range between about 50,000 and 400,000, more preferably 100,000 and 300,000, wherein such molecular weight refers to a weight average molecular weight (Flory). The second stiffening polymer is different from the first stiffening polylmer and also functions as a tackifying thermoplastic polymer. Preferred second stiffening polymers have a melt viscosity of about 10 poises at 157°–205° C.

For example, if the "A" block of the block copolymer is a polystyrene, then the first stiffening thermoplastic polymer preferably is a polystyrene or other thermoplastic aromatic polymer. In addition to stiffening, such a thermoplastic polymer should also aid in mixing the sacrificial binder composition ingredients. A thermoplastic polystyrene polymer such as Styron 495, marketed by Dow Chemical Company, does this because it ha a lower viscosity than the thermoplastic block copolymer at processing conditions; on the other hand it is sufficiently crystalline at room temperature to advantageously stiffen the formed green body. Furthermore, according to this example, if the first stiffening polymer is polystyrene as mentioned, the second stiffening polymer is aromatic but has a different aromatic moiety, e.g., indene. A preferred second polymer is polyindene. Low molecular weight polyidenes have the further advantage of low viscosity at processing conditions. The low viscosity aids flow of the sacrificial binder compositions.

Using two different polymers also advantageously permits the sequential expulsion of the stiffening polymers during firing of the green bodies.

The process aid comprising esters of fatty acids are preferably selected from acetyl ricinoleate esters, which are single and double esters of ricinoleic acid. Their presence serves as an effective processing aid, acting as an anti-stick agent during calendering and extruding. The acetyl ricinoleate esters are also useful in wetting and dispersing the ceramic particulate so as to form a homogeneous mixture. The most useful type of this plasticizer processing aid for the subject invention is the Flexricin plasticizer, such as Flexricin P-4, methyl acetyl ricinoleate, and Flexricin P-6, butyl acetyl ricinoleate.

In this particulate binder mixture, the weight of the thermoplastic block copolymer is greater than the weight of the oil and wax combined, and greater than the weight of the stiffening polymers combined. The weight of the block copolymer is also greater than two times the weight of the oil, the wax, the first stiffening polymer, the second stiffening polymer or the processing aid alone.

Additional process aids which are conventional to molding and forming operations with polymeric materials are likewise useful in the practice of this invention to improve the flow characteristics of the binder-filler mixture to during such operations. Process aids which may be of assistance include stearic acid, polyethylene, polyethylene wax, mixtures of natural waxes and wax derivatives, vegetable fats, partially oxidized polyethylene, etc. Others will be apparent to those skilled in the art.

Other ingredients may be employed in the binders of this invention. For example, antioxidants are useful to retard oxidative degradation of the block polymer during mixing, thus minimizing loss of strength in the green body. The antioxidant also allows more rapid removal of binder during burn-off by minimizing surface oxidation which may tend to seal off the surface. Suitable antioxidants include, but not by way of limitation, 2,6-ditert-butyl-phenol, a polymerized 1,2-dihydro-2,2,4-trimethyl quinoline, 2-mercaptobenzimidazole, tetra-bis-methylene-3-(3,5-ditert-butyl-4-hydroxy phenyl)-propionate methane, etc.

SINTERABLE PARTICULATE

The powdered beta"-alumina precursor particulate most useful in the practice of the method of this invention has a particle size distribution of about 0.1–800 microns, with a preferred average particle size of greater than 3.5 microns and a most preferred particle size between about 3.5–20 microns. Additionally it is most preferred that the percentage of particles with diameters over 100 microns be less than 1.7 percent. The preferred beta"-alumina precursor particulate is prepared by combining sodium carbonate, lithium nitrate and alpha-alumina (Linde C), in such proportions that the final product has a composition of (a) 8.7% soda/0.7% lithia/91.6% alumina, or (b) 8.85% soda/0.75% lithia/90.4% alumina, or (c) 9.25% soda/0.25% lithia/90.5% alumina, or (d) 9.0% soda/0.80% lithia/90.2% alumina all percentages by weight. Composition (b) containing 8.85% soda/0.75% lithia/90.4% alumina (Linde C) was found to be the most suitable for preparing tubes continuously and repeatedly, without impurities and imperfections. Because the extrudates prepared from the higher soda compositions (9.0, 9.25%) were stiffer than those of (b), defects and impurities due to the high pressure required for the extrusion of the material were often found. In contrast, extrudates having a lower soda content 8.7%, as compared to (b), often split during extrusion and had rippled surfaces. However, it was found that each composition could be fabricated with minor processing variations, into tubes having satisfactory properties. Therefore, while particulate composition ratio (b) is most preferred, other less suitable ratios of soda/lithia/alumina can be used in practicing the method of this invention.

The weight proportion of binder to precursor particulate solids of beta"-alumina may vary widely but is preferably as high as possible for dense bodies. Normally, the weight ratios of binder to beta"-alumina precursor particulate will be about 1:2 to 1:7, preferably for very dense bodies between about 1:4 to 1:6.

Note that in order that the ceramic binder composition of this invention be homogeneous and extrudable into tubes suitable for use, as for example, in the sodium sulfur battery, the components have to be combined in a particular order. The proper order of addition of components (including optional components) is: elastomer, antioxidant, beta"-alumina precursor particulate, waxes, stiffening agents, oils and processing aids. Reversing the order of addition of the waxes and stiffening agents results in compositions that can not be extruded. Reversing the order of addition of oils and stiffening agents has the same effect. In selecting the optimum composition of the mixture to be extruded, careful tailoring of the die and the viscosity of the mixture to be extruded is required for preparation of good tubing. The apparent viscosity of the material should be high enough to develop the back pressure needed for knitting of the strips to form a tube. At too low an apparent viscosity, strips are extruded. Of course, if viscosity is too high, excessive pressure will be required to perform the extrusion.

For the preferred particulate ceramic binder composition of the invention, it is preferable to extrude the tubing within three days after mixing the binder-ceramic composition. It was found that the quality of the extrudate deteriorates as a function of time after mixing and also that more force is required to extrude the material. Additionally, although the mixture can be re-extruded, quality of the extrudate lessens with each subsequent extrusion. It is therefore suggested that a maximum of two extrusions be used in the preparation of the tubing.

At extrusion temperatures, the "life" of the mixture in the barrel is approximately 1 hour. This will be slightly longer or shorter depending on the time that has elapsed since the material is mixed and the quality of the tube needed.

Tubes produced by the process of this invention after burn out and sintering, were shown to have properties similar to those of tubes prepared by isostatic pressing and sintering. As a final test of membrane durability, a tube was extruded from the preferred beta"-alumina precursor particulate binder composition after which it was subjected to binder burn out and sintering. One end of the tube was closed with a sodium borosilicate glass and the other end was joined with an alpha-alumina tube with glass. The tube was tested on a helium leak detector and found to have a leak rate of less than $3 \times 10^{-9}$ cc/cm$^2$/sec.

This membrane was built into a device which allowed the tube to be filled with sodium and immersed in a vessel full of sodium. A sodium/ion current could then be passed through the beta"-alumina membrane under the influence of an applied potential. Current densities to 1000 Ma/cm$^2$ will pass through the membrane without damage at a temperature of 300° C. The resistivity of the membrane was approximately 5 ohm cm (0.15 ohm-cm$^2$) at 300° C. and approximately 24 ohm cm (0.72 ohm-cm$^2$) at 150° C. The device was operated continuously at a current density of 500 Ma/cm$^2$ for a period of thirty days at a temperature of 300° C. At the end of that period there was no indication of damage.

The following examples are presented by way of description of the process of the invention and set forth to best mode contemplated by the inventors but are not to be construed as limiting.

EXAMPLE 1

Circular tubes were prepared by extrusion of binder beta"-alumina precursor compositions. These compositions were prepared by combining the following ingredients:

| Material | Amount, grams |
|---|---|
| Solprene 414 | 4.80 |
| Agerite Resin D | 0.53 |
| Sunoco Wax 3420 | 1.15 |

-continued

| Material | Amount, grams |
| --- | --- |
| Sunoco Wax 4412 | 0.90 |
| Styron 495 | 0.70 |
| Picco 6140-3 | 0.70 |
| Flexon 845 | 0.54 |
| Shellflex 371 | 1.70 |
| Flexricin P-4 | 0.94 |
| Powdered beta"-alumina precursor ($Na_2O$ 8.85%, $Li_2O$ 0.75%, $Al_2O_3$ 90.4%) | 50.00 |

In the above composition the waxes (Sunoco Wax 3420 and Sunoco Wax 4412) have different initial boiling points and the oils (Flexon 845 and Shellfex 371) have different initial boiling points.

(a) Preparation of powdered beta"-alumina precursor

Dried samples of sodium carbonate, lithium nitrate and Linde C alumina (1 micrometer) were combined and milled for one hour in a polyethylene container using high purity alumina balls. The ratio of reagents was as follows: $Na_2O$ 8.85%, $Li_2O$ 0.75% and Linde C alumina 90.4%. The powder mix was calcined for 2 hours at 1260° C. in platinum crucibles. On cooling, the powder was crushed and milled for 1 hour in polyethylene vessels using alumina balls. X-ray diffraction indicated that the powders were primarily $\beta\text{-}Al_2O_3$ and $Na_2O\text{-}Al_2O_3$ with smaller amounts of beta"-alumina and traces of $\alpha\text{-}Al_2O_3$. Scanning Electron Microscopy indicated that the milling operation effectively broke down the loosely bonded agglomerates formed during calcination leaving irregularly shaped porous particles. The following typical particle size distributions were found in two different samples of powdered beta"-alumina percursor as prepared in (a)

| Particle Diameter | Wt. % | Wt. % |
| --- | --- | --- |
| Below 6.35 Microns | 6.17 | 4.85 |
| 6.35–8.00 Microns | 11.15 | 12.77 |
| 8.00–10.08 Microns | 10.68 | 11.95 |
| 10.08–12.70 Microns | 12.40 | 13.08 |
| 12.70–16.00 Microns | 13.87 | 13.72 |
| 16.00–20.20 Microns | 14.75 | 13.48 |
| 20.20–25.40 Microns | 14.18 | 11.35 |
| 25.40–32.00 Microns | 9.62 | 9.00 |
| 32.00–40.30 Microns | 3.83 | 4.37 |
| 40.30–50.80 Microns | 0.75 | 1.60 |
| 50.80–64.00 Microns | 0.32 | 0.68 |
| 64.00–80.60 Microns | 0.60 | 0.45 |
| 80.60–101.60 Microns | 0.53 | 0.70 |
| Above 101.60 Microns | 1.15 | 1.00 |
| Median Particle Size | 15 Microns | 14 Microns |

(b) Mixing of beta"-alumina precursor with the binder ingredients

Mixing of binder composition is carried out on a 80×180 mm two-roll vented research mill. The mill rolls were electrically heated with individual heat controls and chrome coated. The mill speed was 3.2 m per minute and had a friction ratio of 1.4 to 1. The gap between the rolls varied from 0.17 to 0.76 mm during mixing. The temperature of both rolls was set at 310° F. and allowed to stabilize.

The order of addition of binder ingredients and specific conditions used in the mixing steps are listed below:

1. Set roll gap at 0.17 mm and add thermoplastic elastomer (Solprene 414). As soon as a Solprene 414 melt is formed on the rolls, add 5% by wt. of beta"-alumina precursor and the Agerite resin D.
2. Subsequently keep opening the mill rolls and adding the rest of the beta"-alumina precursor. The gap between the two rolls should be 0.70–0.76 mm at the completion of addition of beta"-alumina precursor.
3. Add petroleum waxes slowly (Sunoco Wax 3420 and 4412). The powdery material falling off the mill rolls is placed on mill rolls continuously. The banded material at edges of rolls is cut with sharp knife and placed on center of rolls repeatedly. The temperature of rolls is raised to 320° F. for the next step.
4. Then polystyrene (Styron 495) and polyindene resin (Picco-6140-3) are added to the mix in that order. The mix is still crumbling at this stage. The banded material at edges of rolls is cut continuously and placed in center of rolls until completion of mixing.
5. The addition of Flexon 845 and Shellflex 371 follows with cutting of material at edges of rolls and returning the cut and crumbled material to the middle of rolls.
6. Flexricin P-4 is incorporated to the mix slightly slower than the other two oils. The temperature of rolls is brought to 280° F. before initiation of addition of Flexricin P-4.
7. Upon completion of addition of all the ingredients, the mix is cut at edges of rolls and sliced in middle of rolls for 5 minutes. The cut material is returned to the center of rolls.
8. Mixing is completed within 40–45 minutes.
9. The mill is set at a speed of 1.5 m/per minute and the mix is sliced off the mill and transferred to the extrusion set-up.
10. Total weight of mixed material is 62.0 gms.

At the completion of mixing cycle, the binder composition is homogeneous. This is indicated by breaking a small piece of tape and examing its consistency.

(c) Extrusion of Tubes

Circular tubes with approximately 12 mm diameter and a wall thickness of 1000 μm were extruded with a ram type extrusion apparatus. To perform the extrusion, the binder-ceramic composition is broken or cut into a size convenient for insertion into the barrel of the extruder. After insertion into the preheated extruder barrel, the ram is inserted and a force of approximately 250 kg to 500 kg is applied to pack the material. At this point, the ram is stopped and force allowed to decay as the material is preheated for about 15 minutes prior to extrusion. After the preheat, the ram is forced against the material until tubes extrude from the die orifice. The rate at which tube is extruded and the temperature of barrel and die (137°–145° C.) are adjusted until a smooth tube is obtained. The extrusion rate is about 600 mm/minute. In order to maintain straight tubing while it is hot enough to deform, the tube is extruded over a mandrel of 10.5 mm diameter. Straight, stiff tubing was obtained. The inside and outside surfaces were very smooth.

(d) Binder Removal and Sintering of Tubes

Binder removal is accomplished by heating the tubes in a circulating oven (Temperite, Type MU 182424A) using filtered air as the atmosphere. The current typical binder burn-out schedule is listed below. It has been found to be advantageous to support the tubes in a vertical position by slipping them over an alumina mandrel whose diameter is small enough to allow for shrinkage of the tube during binder removal. The tubes were removed from the burn-out oven and placed immediately in a desiccator which had been preheated to 65° C. Tubes and desiccator are allowed to cool to room temperature and the tubes are held in the desiccator until needed for sintering.

| TYPICAL BINDER BURN-OUT SCHEDULES | |
|---|---|
| Temperature Range °C. | Rate °C./Hour |
| 25–150 | 23 |
| 150–600 | 9.7 |
| 600 | hold for 4 hours |
| 600–150 | 52 |
| 150 | hold for 7.3 hours |
| 150–65 | allow oven to cool at its own rate |

After binder burn out tubes were encapsulated in platinum cylinders to prevent the loss of $Na_2O$ and arranged in vertical positions to avoid eliptical distortion, the cold furnace was slowly heated to 1585° C., held for one hour, then allowed to cool to room temperature. This technique was effective in sintering tubes having walls 400 μm and 1000 μm thick. However, when membranes having 140 μm walls were sintered, enough $Na_2O$ was lost from the small volume of the material in establishing an equilibrium vapor pressure within the platinum tube to prevent sintering to high densities. This problem was solved by placing partially sintered pellets of beta"-alumina in the platinum tubes with the thin membranes. Membranes having walls of 700 μm, 300 μm and 140 μm were all sintered to densities greater than 98% of theoretical.

EXAMPLE 2

Example 1 was repeated with the exception that the tubes had diameter (O.D.) of approximately 7 mm and wall thickness of 400 μm. The technique for extruding this size differed primarily in the dimensions of die set and attached mandrel. Tubes with smooth surfaces were extruded.

EXAMPLE 3

Example 1 was repeated with the exception that the tubes had diameters (O.D.) of approximately 1.8, 4.0 and 6.2 cm and wall thickness of 1–3 mm respectively. Tubes with these dimensions were prepared by changing the dimensions of the die set and attached mandrel. Tubes with good appearance and properties were prepared. They had properties equivalent to those tubes made by isostatic processing.

EXAMPLE 4

A binder beta"-alumina precursor composition was prepared by combining the following ingredients:

| Material | Amount, grams |
|---|---|
| Solprene 414 | 4.50 |
| Agerite Resin D | 0.53 |
| Sunoco Wax 3420 | 3.93 |
| Flexon 845 | 2.37 |
| Flexricin P-4 | 0.95 |
| beta"-alumina precursor ($Na_2O$ 8.85% $Li_2O$ 0.75%, alumina 90.4%) | 50.00 |

The ingredients were mixed and extruded according to Example 1. Tubes with a diameter of 12 mm and wall thickness of 1000 μm were extruded. These tubes were softer than the tubes of Example 1. The inside and outside surfaces were good.

EXAMPLE 5

A binder-ceramic composition was obtained by combining the following ingredients:

| Material | Amount, grams |
|---|---|
| Solprene 414 | 8.4 |
| Styron 475 | 1.3 |
| Sunoco Wax 4412 | 1.2 |
| Flexricin P-4 | 0.6 |
| Agerite resin D | 0.7 |
| beta"-alumina precursor ($Na_2O$ 8.85%, $Li_2O$ 0.75%, alumina 90.4% | 50.00 |

The ingredients were mixed and extruded according to procedures of Example 1. Tubes with a diameter of approximately 18 mm and wall thickness of 1000 μm were extruded. These tubes were very stiff and had tougher surface. The surface contained metal contamination resulting from high shearing of material against the surface of extrusion barrel.

EXAMPLE 6

Example 1 was repeated with the exception that the composition of beta"-alumina precursor was as follows: $Na_2O$ 9.0%, $Li_2O$ 0.80% and alumina 90.20%. The components were mixed according to procedure of Example 1. The mix was homogeneous and stiff. In order to extrude tubes, the application of higher forces on the extrusion form was required and extrusion was not continuous because of splitting of tubing. Extrusion attempts were made at a temperature range of 130°–170° C.

EXAMPLE 7

The procedures of Example 1 were repeated with the exception of composition of beta"-alumina precursor. The powdered precursor contained $Na_2O$ 8.7%, $Li_2O$ 0.7% and alumina 90.6% and prepared according to procedure of Example 1. The mix was softer and could be extruded at a lower temperature range (90°–110° C.). The surface of these tubes was inferior to those of Example 1, 2 and 3. Attempts to extrude at higher temperatures (110°–170° C.) resulted in split tubes.

EXAMPLE 8

The procedure of Examples 1, 2 and 3 were repeated with the only exception that the amount of Flexricin P-4 was increased to 1.2 grams. The homogeneous mixes were softer and upon extrusion resulted in tubes with smoother surfaces.

EXAMPLE 9

The procedures of Example 1, 2 and 3 were repeated with the exception of mixing procedure. The ingredients were placed on roll mill very quickly and in no particular order. The extrusion was not continuous and the tubes had defects.

EXAMPLE 10

The procedures of Examples 1, 2 and 3 were repeated with the exception that the volume percent of powdered beta"-alumina precursor was raised to 57% by volume. Processing of mixture was not as good as that of Examples 1, 2 and 3.

EXAMPLE 11

The volume fraction of powdered beta"-alumina precursor in Examples 1, 2 and 3 was reduced to 53% by volume and the volume fraction of binder ingredients was raised to 47% of total mix. Upon repeating the procedures of Examples 1, 2 and 3, the mix was extruded and resulted in good circular tubes.

EXAMPLE 12

The materials of Examples 1, 2 and 3 were mixed according to procedure of Example 1 and stored for 20 days of storage, the mixes were not extruded. Upon remixing these compositions, circular tubes were extruded.

EXAMPLE 13

The following ingredients were combined for preparing binder-ceramic compositions.

| Material | Amount, grams |
| --- | --- |
| Solprene 414 | 7.75 |
| Agerite Resin D | 0.85 |
| Sunoco Wax 3420 | 3.31 |
| Styron 495 | 2.26 |
| Flexon 845 | 3.91 |
| Flexricin P-4 | 1.22 |
| beta"-alumina precursor ($Na_2O$ 8.85% $Li_2O$ 0.75%, alumina 90.4% | 80.70 |

The above ingredients were mixed as in Example 1. Extrusion of mixes and binder removal were difficult.

EXAMPLE 14

The following ingredients were combined for preparing binder-ceramic compositions.

| Material | Amount grams |
| --- | --- |
| Solprene 414 | 6.55 |
| Agerite Resin D | 0.53 |
| Picco 6140-3 | 0.68 |
| Shellflex 371 | 1.80 |
| Flexricin P-4 | 0.94 |
| beta"-alumina precursor $Na_2O$ 8.85%, $LiO_2$ 0.75% alumina 90.4% | 50.00 |

The above materials were mixed as in Example 1. The tubes had defects.

EXAMPLE 15

The following ingredients were combined as in Example 1:

| Material | Amount, grams |
| --- | --- |
| Solprene 414 | 6.55 |
| Agerite resin D | 0.53 |
| Picco 6140-3 | 0.68 |
| Flexricin P-4 | 4.16 |
| beta"-alumina precursor ($Na_2O$ 8.85% $Li_2O$ 0.75%, alumina 90.4%) | 50.00 |

Upon completion of mixing, the mix was soft and difficult to process.

EXAMPLE 16

The procedures of Examples 1, 2 and 3 were repeated, however, with the exception that the following composition of beta"-alumina precursor was used. Two different batches of beta"-alumina precursor were prepared (each batch $Na_2O$ 8.85%, $Li_2O$ 0.75% and alumina 90.4%) and then blended. One batch was prepared using Linde C alumina, average particle size one micrometer, and the other was made using Alcoa XA-16-SG, a ground alpha-alumina powder having a wide distribution of particle sizes ranging from about 40 micrometers to less than 1 micrometer. The powders were calcined for 2 hours at 1260° C. in platinum crucibles. On cooling, the powders were individually crushed and milled for 1 hour in polyethylene vessels using alumina balls. The two powders were combined in equal parts in a plastic container containing alumina balls and shaken together for 30 minutes on a paint shaker. After mixing, these compositions were extruded (extrusion barrel and die temperature 125°-130+ C.). The surface of tubes was very rough. The tubes were defective at the knit-line and unsuitable for end capping.

EXAMPLE 17

The procedures of Examples 1, 2 and 3 were repeated with the exception that the temperature of extrusion barrel and die set were 170° C. The extruded green bodies had defects.

EXAMPLE 18

The procedures of Examples 1, 2 and 3 were repeated with the exception that the extrusion was carried out at 125° C. The green body was splitting during extrusion.

EXAMPLE 19

The procedures of Examples 1, 2 and 3 were repeated with the exception that no metal rod (mandrel) was attached to the die. The tubes did not have good dimensional precision.

EXAMPLE 20

The procedures of Examples 1 were repeated with the exception that the volume percent of powdered B"-alumina precursor was 45%. The sintered tubes had lower density than those of Example 1.

EXAMPLE 21

The following ingredients were mixed according to Example 1.

| Material | Amount, grams |
| --- | --- |
| Kraton 1101 | 4.73 |
| Sunoco Wax 4412 | 2.31 |
| Flexon 845 | 2.16 |
| Flexricin P-4 | 1.79 |
| Agerite Resin D | 0.67 |
| beta"-alumina precursor ($Na_2O$ 8.85% $Li_2O$ 0.75%, alumina 90.4%) | 50.00 |

The mix was extruded as in Example 1. The resulting tubing had small defects.

In the above Examples 1-20, Solprene 414C is a thermoplastic elastomer manufactured by Phillips Petroleum. It is a radial block copolymer of styrene and butadiene with a molecular weight (Mw) of about 160,000. The 414C has a specific gravity of 0.95, melt flow of 72 (grams/10 min. at 190° C. and apparent viscosity of 46,000 poise at 10 sec.$^{-1}$ at room temperature. Agerite Resin D is an antioxidant available from Vanderbilt Company; it is a polymerized 1,2-dihydro-2,2,4-trimethyl quinoline. Typical properties of Agerite Resin D are specific gravity=1.06; softening point+74° C.;

and very soluble in acetone. Sunoco Wax 3420 is a paraffinic wax that melts at 58° C. Specific gravity at 15° C. is 1.2 g/cc and kinematic viscosity is 3.6 centistokes at 99° C. Sunoco Wax 4412 is a paraffinic wax that melts at 145° F. Specific gravity is 0.925 at 15° C. and kinematic viscosity at 90° C. is 4.2 centistokes. Styron 495 is a polystyrene available from Dow Chemical Company; it has a vicat softening point of 97° C., melt flow rate of 3.5 grams/10 min. and specific gravity of 1.05 at 15° C. Styron 495 has a molecular weight (Mw) of 250,000. Picco 6140-3 is a polyindene available from Hercules; its melt viscosity is 10 poises at 205° C. The softening point is 140° C. and density 1.07 at 25° C. Flexon 845 is a paraffinic petroleum oil from Exxon Chemical Company. Flexon 845 has a viscosity of 230 SUS at 99° C. and Aniline Point is 117° C. Shellflex 371 is a paraffinic-naphthenic oil available from Shell Oil Company. Shellflex has a specific gravity of 0.897 at 15° C.; it has 49% paraffinic carbon, 50% naphthenic carbon and 1% aromatic carbon. The molecular weight is 400, viscosity at 38° C. is 427 S.U.S., and Aniline Point is 100° C. Flexricin P-4 is methyl acetyl ricinoleate. Its specific gravity is 0.936 and boiling point at 2 mm is 185° C. Its molecular weight is 346.

In view of this disclosure, many modifications of this invention will be apparent to those skilled in the art. It is intended that all such modifications which fall within the true scope of this invention be included within the terms of the appended claims.

What is claimed is:

1. A method of extruding a tubular green body which comprises:

providing a mixture of about 40–60 volume percent of sinterable particulate solids consisting essentially of a particle size distribution of beta"-alumina percursor particulate comprising alpha-alumina and about 60–40 volume percent organic sacrificial binder in a means for extruding said mixture;

applying heat and pressure to the mixture in the extruder means, said extruder means containing an extrusion die wherein the ratio of the length of the die to the wall thickness of said tubular green body is greater than about 5:1, and maintaining the heat and pressure on said mixture so as to extrude tubing over a mandrel at a rate which allows extrusion of a length of smooth tube, wherein said sacrificial binder consists essentially of:

(a) a thermoplastic block copolymer component selected from the group consisting of linear, radial and linear and radial block copolymers, said block copolymers having a first aromatic block which is glassy or crystalline at 20°–25° C., and which has a softening point between about 80°–250° C. and a second aliphatic block which is different from said first block and behaves as an elastomer at temperatures between about 15° C. below and about 100° C. above said softening point of said first block;

(b) two oils having different initial boiling points and being selected from the group consisting of oil at least about 75 percent by weight of which boils in a range of between about 285°–560° C., and which has a viscosity of between about 30–220 Saybolt Universal Seconds (SUS) at 100° C. and an Aniline Point in a range between about 75°–125° C.;

(c) two waxes having different initial boiling points and being selected from the group consisting of wax melting at a temperature in a range of between about 55° C.–80° C., and at least 75 percent by weight of which boils at temperatures in a range between about 315° C.–490° C.;

(d) a first stiffening thermoplastic polymer which is glassy or crystalline at 20°–25° C. and which has a softening point between about 80°–250° C. and comprises aromatic monomeric units associable with block copolymer (a);

(e) a second stiffening thermoplastic polymer, different from said first polymer and which is glassy or crystalline at 20° C.–25° C., and which has a softening point between about 80°–250° C. and comprises aromatic monomeric units associable with block copolymer (a); and (f) processing aid comprising an ester of fatty acids, the weight of (a) being greater than (b) and (c) combined, greater than (d) and (e) combined and greater than about two times (b), (c), (d), (e), or (f) alone, and the order of mixing being said thermoplastic block copolymer (a), said sinterable particulate, said waxes (c), said stiffening agent (d) and (e), said oils (b), and said processing aids (f).

2. A method in accordance with claim 1 wherein said particle size distribution comprises particle sizes between about 0.1–850 microns.

3. A method in accordance with claim 2 wherein average particle size of said particle size distribution is greater than about 3.5 microns.

4. A method in accordance with claim 3 wherein said average particle size is between about 3.5–20 microns.

5. A method in accordance with claim 1 wherein said beta"-alumina precursor solids consist essentially of 8.85 weight percent $Na_2O$, 0.75 weight percent $Li_2O$ and 90.4 weight percent $Al_2O_3$.

6. A method in accordance with claim 5 wherein the temperature of said mixture during extrusion is between about 135°–150° C.

7. A method in accordance with claim 6 wherein the temperature of said mixture during extrusion is between about 137°–145° C.

8. A method in accordance with claim 1 wherein said method further comprises:

preheating said means for extruding said mixture prior to insertion of said mixture into said means.

9. A method in accordance with claim 1 wherein said method further comprises cutting the extruded tubular green body from said die and placing said body upon another mandrel for cooling to ambient temperature.

10. A method in accordance with claim 9 wherein said tubular green body is further subjected to binder burn out followed by sintering wherein during binder burn out said bodies are placed over a mandrel in a vertical position.

11. A method in accordance with claim 1, wherein said block copolymer component comprises said radial block copolymer.

12. A method in accordance with claim 11, wherein said first block comprises a polymer of styrene.

13. A method in accordance with claim 12, wherein said second block comprises a polymer of butadiene.

14. A method in accordance with claim 13, wherein said polymer of butadiene comprises an unsaturated polymer.

15. A method in accordance with claim 14, wherein said first polymer comprises a polystyrene thermoplastic.

16. A method in accordance with claim 15, wherein said second polymer comprises a polyindene thermoplastic.

17. A method in accordance with claim 11, wherein said radial block copolymer has molecular weight (Mw) of about 100,000–200,000.

18. A method in accordance with claim 17, wherein said radial block has a specific gravity between about 0.9–1.

19. A method in accordance with claim 18, wherein said radial block polymer has an apparent viscosity of between about 40–50 thousand poise at $10^{-1}$ sec. at about 20°–25° C.

20. A method in accordance with claim 1 wherein said ester of fatty acids is an acetyl ricinoleate ester.

21. A method in accordance with claim 20, wherein said ester is selected from methyl acetyl ricinoleate and butyl acetyl ricinoleate.

* * * * *